United States Patent
Rajendran et al.

(10) Patent No.: US 12,255,501 B2
(45) Date of Patent: Mar. 18, 2025

(54) POWER TOOL INCLUDING A PRINTED CIRCUIT BOARD WITH A HIGH IMPEDANCE TRACE

(71) Applicant: MILWAUKEE ELECTRIC TOOL CORPORATION, Brookfield, WI (US)

(72) Inventors: Lokeshwaran Rajendran, West Allis, WI (US); Ryan A. Khatib, Waukesha, WI (US); Noah P. Seiler, Milwaukee, WI (US); Mitchell A Ellena, West Allis, WI (US); Daniel J. Tomcheck, Denmark, WI (US); Jack J. Glennon, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 6 days.

(21) Appl. No.: 18/310,718

(22) Filed: May 2, 2023

(65) Prior Publication Data
US 2023/0378853 A1    Nov. 23, 2023

Related U.S. Application Data

(60) Provisional application No. 63/343,889, filed on May 19, 2022.

(51) Int. Cl.
*H02K 11/25*     (2016.01)
*B25F 5/02*      (2006.01)
(Continued)

(52) U.S. Cl.
CPC ............... *H02K 11/25* (2016.01); *B25F 5/02* (2013.01); *H02K 7/145* (2013.01);
(Continued)

(58) Field of Classification Search
CPC ........ H02K 11/25; H02K 7/145; H02P 29/68; H02P 29/027; B25F 5/02
See application file for complete search history.

(56) References Cited

U.S. PATENT DOCUMENTS

| | | |
|---|---|---|
| 4,490,771 A | 12/1984 | Huber et al. |
| 4,556,803 A | 12/1985 | Weigert |

(Continued)

FOREIGN PATENT DOCUMENTS

| | | |
|---|---|---|
| DE | 2729002 A1 | 1/1979 |
| DE | 202020102550 U1 | 8/2020 |
| WO | 2009065390 A1 | 5/2009 |

OTHER PUBLICATIONS

Milwaukee Electric Tool Corp., "M18 Fuel HP Sawzall® Reciprocating Saw," Service Parts List, Bulletin No. 54-40-2780, Aug. 2022 (6 pages).

(Continued)

*Primary Examiner* — Nathaniel C Chukwurah
(74) *Attorney, Agent, or Firm* — Michael Best & Friedrich LLP

(57) ABSTRACT

A power tool includes a housing having a motor housing portion and a handle portion. A motor having a motor axis is positioned within the motor housing portion. The power tool further includes a first printed circuit board positioned within the motor housing portion. The first printed circuit board intersects the motor axis. The power tool also includes a second printed circuit board positioned within the motor housing. The second printed circuit board intersects the motor axis. The second printed circuit board includes a conductive high impedance trace that is configured to interrupt electric power to the motor in response to a current that exceeds a current limit.

20 Claims, 10 Drawing Sheets

(51) Int. Cl.
  *H02K 7/14* (2006.01)
  *H02K 11/00* (2016.01)
  *H02P 29/024* (2016.01)
  *H02P 29/68* (2016.01)

(52) U.S. Cl.
  CPC ........ *H02K 11/0094* (2013.01); *H02P 29/027* (2013.01); *H02P 29/68* (2016.02); *H02K 2211/03* (2013.01)

(56) References Cited

U.S. PATENT DOCUMENTS

| | | | |
|---|---|---|---|
| 6,604,666 B1 | 8/2003 | Pedicini et al. | |
| 6,705,503 B1 | 3/2004 | Pedicini et al. | |
| 6,766,935 B2 | 7/2004 | Pedicini et al. | |
| 6,769,593 B2 | 8/2004 | Pedicini et al. | |
| 6,796,477 B2 | 9/2004 | Chen | |
| 8,011,441 B2 | 9/2011 | Leimbach et al. | |
| 8,011,547 B2 | 9/2011 | Leimbach et al. | |
| 8,230,941 B2 | 7/2012 | Leimbach et al. | |
| 8,261,955 B2 | 9/2012 | Wolf et al. | |
| 8,267,296 B2 | 9/2012 | Leimbach et al. | |
| 8,267,297 B2 | 9/2012 | Leimbach et al. | |
| 8,286,722 B2 | 10/2012 | Leimbach et al. | |
| 8,387,718 B2 | 3/2013 | Leimbach et al. | |
| 8,602,282 B2 | 12/2013 | Leimbach et al. | |
| 8,763,874 B2 | 7/2014 | McCardle et al. | |
| 9,676,088 B2 | 6/2017 | Leimbach et al. | |
| 10,478,954 B2 | 11/2019 | Leimbach et al. | |
| 10,967,492 B2 * | 4/2021 | Ferris | B25C 7/00 |
| 11,011,031 B2 | 5/2021 | Suzuki et al. | |
| 11,034,007 B2 | 6/2021 | Leimbach et al. | |
| 11,141,849 B2 | 10/2021 | Ferris et al. | |
| 11,148,268 B2 | 10/2021 | Zhang | |
| 11,185,971 B2 | 11/2021 | Carrier et al. | |
| 11,241,776 B2 | 2/2022 | Leimbach et al. | |
| 11,285,593 B2 | 3/2022 | Wang | |
| 2004/0232194 A1 | 11/2004 | Pedicini et al. | |
| 2013/0314201 A1 | 11/2013 | Poh et al. | |
| 2014/0263535 A1 | 9/2014 | Rajani et al. | |
| 2017/0129085 A1* | 5/2017 | Miyashita | B25C 5/15 |
| 2019/0207339 A1 | 7/2019 | Suzuki et al. | |
| 2019/0255690 A1 | 8/2019 | Kondou et al. | |
| 2019/0262981 A1 | 8/2019 | Sprenger et al. | |
| 2020/0008300 A1* | 1/2020 | Lewis | H02M 7/48 |
| 2020/0262044 A1 | 8/2020 | Ferris et al. | |
| 2020/0391367 A1 | 12/2020 | Tsai et al. | |
| 2021/0062942 A1 | 3/2021 | Besser et al. | |
| 2021/0099055 A1 | 4/2021 | Wachter et al. | |
| 2021/0305661 A1* | 9/2021 | Gyoda | H01M 10/46 |
| 2021/0328482 A1* | 10/2021 | Rutowski | H02K 11/0094 |
| 2021/0354277 A1 | 11/2021 | Morimura | |
| 2022/0001521 A1 | 1/2022 | Ferris et al. | |
| 2022/0063075 A1 | 3/2022 | Carrier et al. | |
| 2022/0105614 A1 | 4/2022 | Robinson et al. | |
| 2022/0123565 A1 | 4/2022 | Ichikawa et al. | |

OTHER PUBLICATIONS

Koehler, "Milwaukee M18 Fuel Super Sawzall 2722 Review," <https://www.protoolreviews.com/milwaukee-m18-fuel-super-sawzall-2722-review/> web article dated Mar. 6, 2020 (11 pages).

Extended European Search Report for Application No. 23171878.4 dated Aug. 22, 2023 (10 pages).

* cited by examiner

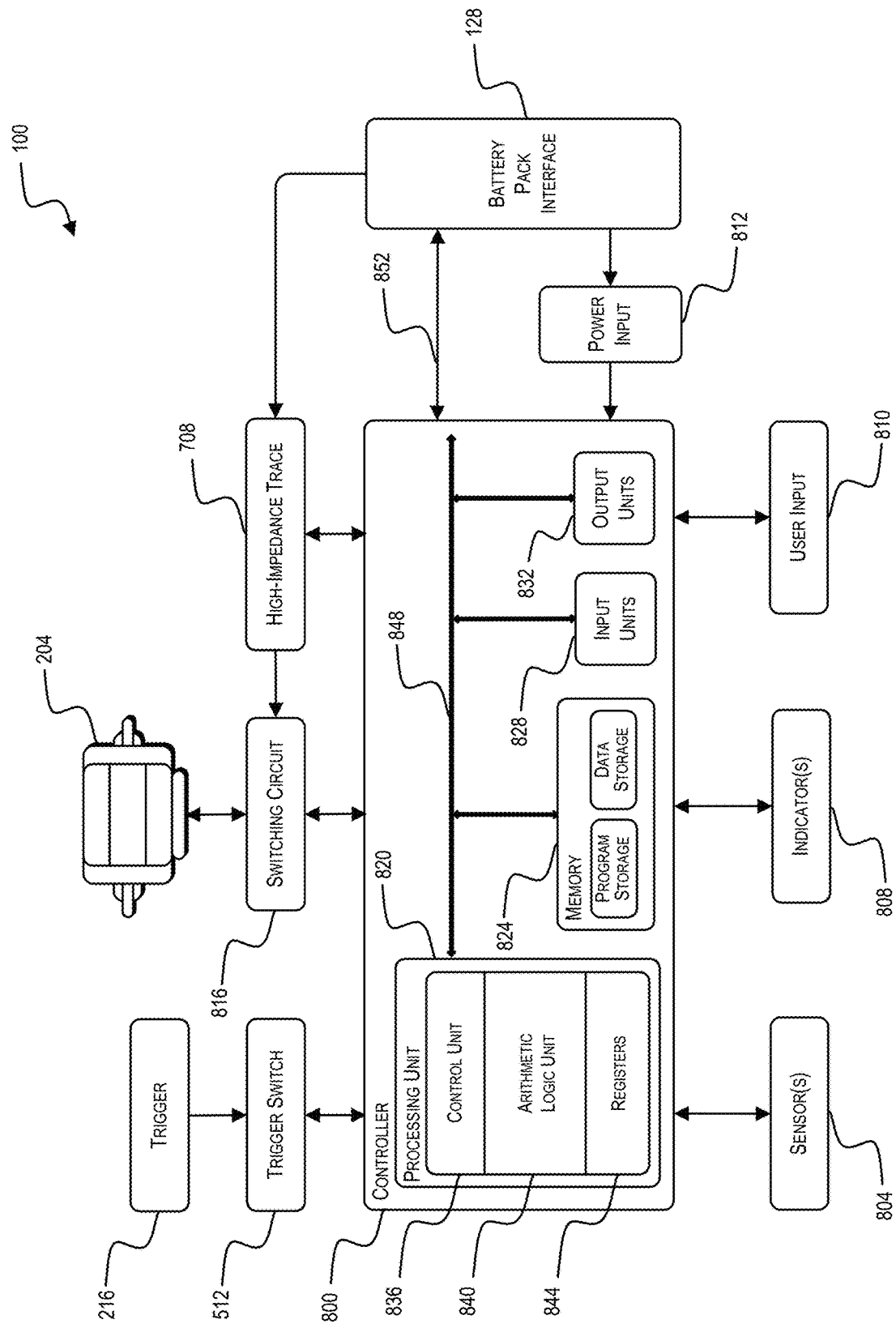

POWER TOOL INCLUDING A PRINTED CIRCUIT BOARD WITH A HIGH IMPEDANCE TRACE

RELATED APPLICATIONS

This application claims the benefit of U.S. Provisional Patent Application No. 63/343,889, filed May 19, 2022, the entire content of which is hereby incorporated by reference.

FIELD

Embodiments described herein relate to power tools, such as powered fastener drives.

SUMMARY

Power tools described herein include a housing including a motor housing portion and a handle portion, a motor positioned within the motor housing portion, a battery pack interface configured to receive a battery pack, and a printed circuit board. The motor includes a motor axis. The battery pack interface is configured to be electrically connected to the motor for supplying electrical power to the motor. The printed circuit board is positioned within the motor housing portion. The printed circuit board intersects the motor axis. The printed circuit board includes a conductive high impedance trace that is configured to interrupt electric power to the motor in response to a current that exceeds a current limit.

Power tools described herein include a housing, a motor, a battery pack interface, a first printed circuit board, and a second printed circuit board. The housing includes a motor housing portion and a handle portion. The motor is positioned within the motor housing portion. The motor includes a motor axis. The battery pack interface is configured to receive a battery pack. The battery pack interface is configured to be electrically connected to the motor for supplying electrical power to the motor. The first printed circuit board is positioned within the motor housing portion. The first printed circuit board intersects the motor axis. The second printed circuit board is positioned within the motor housing. The second printed circuit board intersects the motor axis. The second printed circuit board includes a conductive high impedance trace that is configured to interrupt the electric power to the motor in response to a current that exceeds a current limit.

Methods of operating a power tool described herein include driving a motor, sensing, with a thermistor coupled to a printed circuit board, a temperature of a conductive high impedance trace on the printed circuit board, receiving, with a controller, a signal from the thermistor related to the temperature of the conductive high impedance trace, determining, with the controller, whether the temperature of the conductive high impedance trace exceeds a first threshold, and disabling operation of the motor when the temperature of the conductive high impedance trace exceeds the first threshold.

Before any embodiments are explained in detail, it is to be understood that the embodiments are not limited in application to the details of the configurations and arrangements of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

BRIEF DESCRIPTION OF THE DRAWINGS

FIG. 8 illustrates a control system for the power tool of FIG. 1, according to embodiments describes herein.

DETAILED DESCRIPTION

Figure 1:
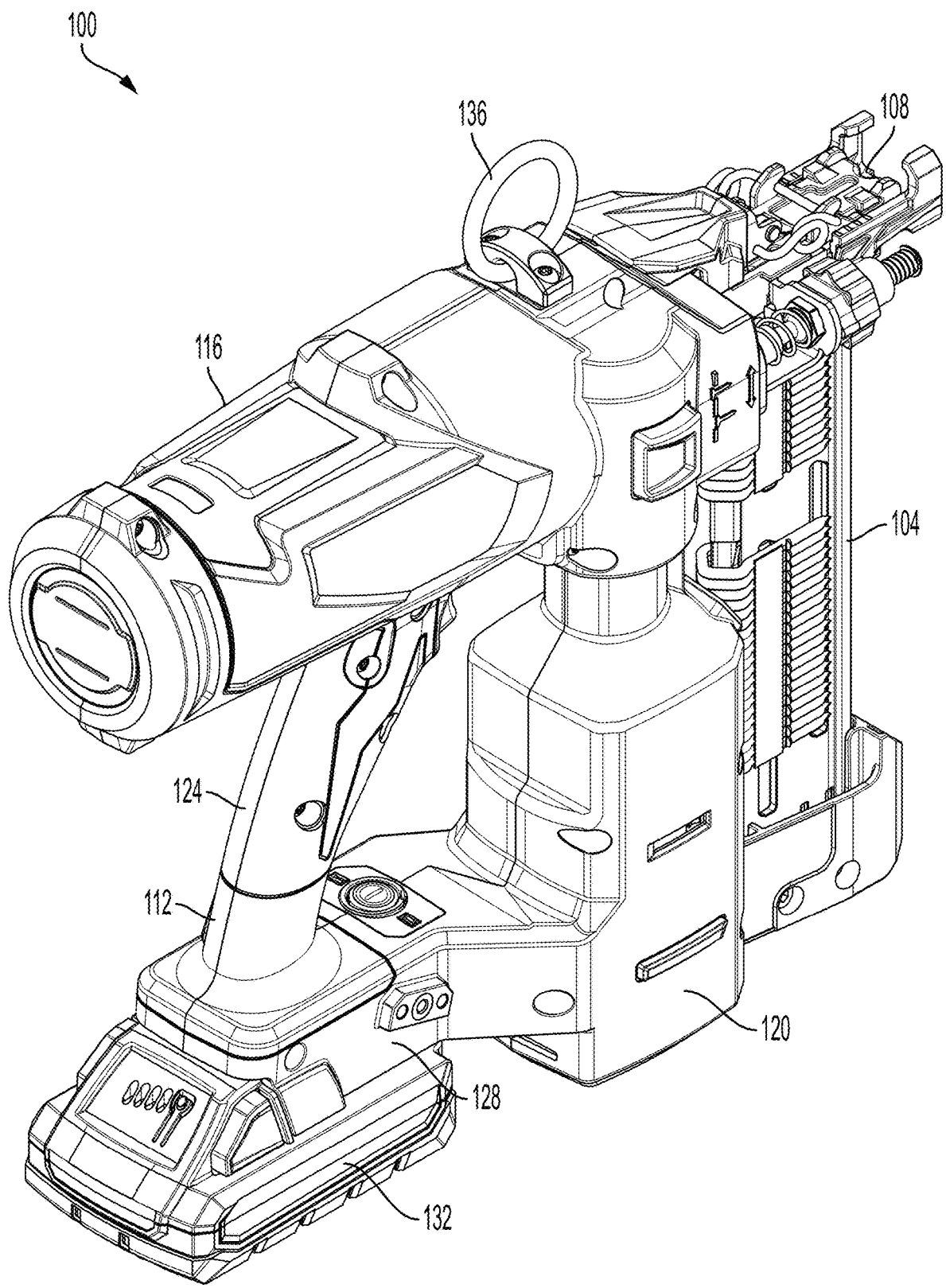
FIG. 1 illustrates a perspective view of a power tool, according to embodiments described herein.

FIG. 1 illustrates a perspective view of a power tool 100. In the illustrated example, the power tool 100 is a fastener driver 100 (e.g., a fencing stapler). However, the power tool 100 may be another type of fastener driver (e.g., a nailers) or another type of power tool (e.g., a sander, a power drill, etc.). The fastener driver 100 is configured to drive fasteners held within a magazine 104 into a workpiece. The fastener driver 100 includes a nosepiece 108 and a housing 112. The housing 112 includes a first or cylinder housing portion 116, a second or motor housing portion 120 extending from the cylinder housing portion 116, a handle portion 124 extending from the cylinder housing portion 116, and a battery pack interface 128 located on an opposite end of the handle portion 124. The battery pack interface 128 is configured to receive a removable and rechargeable battery pack 132. A hog ring or tether 136 may be coupled to the housing 112. The tether 136 may be coupled to a lanyard or the like to connect the driver to the user.

Figure 2:
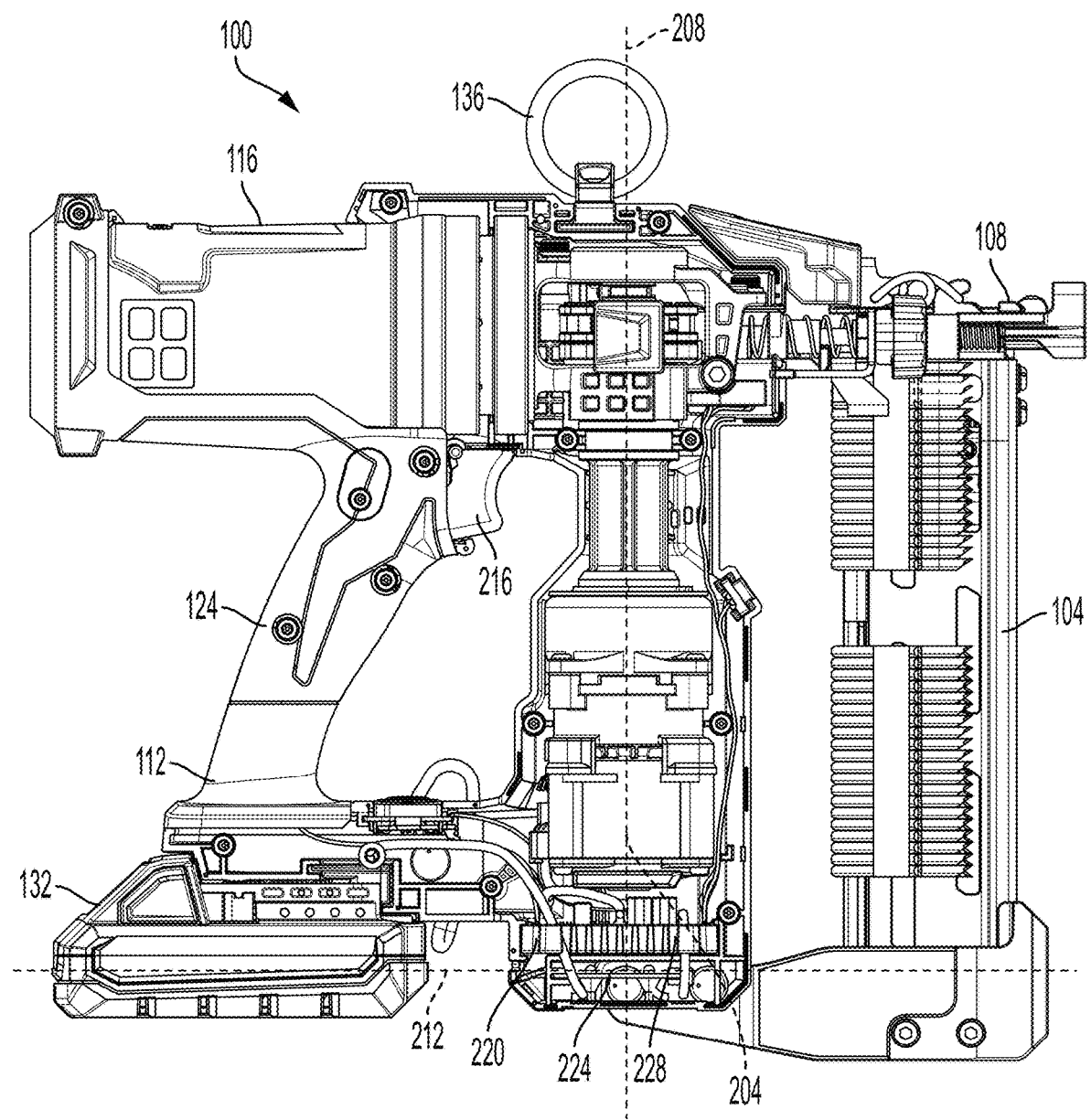
FIG. 2 illustrates a side section view of the power tool of FIG. 1, according to embodiments described herein.

FIG. 2 illustrates a side section view of the powered fastener driver 100, with portions of the housing 112 removed. The motor housing portion 120 is configured to support a motor 204. The motor 204 defines a motor axis 208 through the motor housing portion 120. The battery pack 132 is electrically connectable to the fastener driver 100 for supplying electrical power to the motor 204. The battery pack interface 128 defines a battery pack insertion axis 212 that is, for example, perpendicular to the motor axis 208. The handle portion 124 supports a trigger 216, which is configured to be depressed by a user to initiate a firing cycle of the fastener driver 100.

The motor housing portion 120 is further configured to support a first printed circuit board 220 and a second printed circuit board 224. The second printed circuit board 224 is separate from the first printed circuit board 200, but can be electrically connected to the first printed circuit board 200. The first printed circuit board 220 includes, for example, a controller (see FIG. 8), one or more switches (e.g., FETs), etc. In some embodiments, the first printed circuit board 220 is mounted to or otherwise in thermal communication with a heat sink 228. The second printed circuit board 224 includes a conductive high impedance trace. The motor axis 208 intersects the first printed circuit board 220 and the second printed circuit board 224. In some embodiments, the motor axis 208 is perpendicular to and passes through the approximate centers of the first and second printed circuit boards 220, 224 such that the first and second printed circuit boards 220, 224 are approximately centered about the motor axis 208. In other embodiments, the motor axis 208 is perpendicular to the first and second printed circuit boards 220, 224, but one or both of the first and second printed circuit boards 220, 224 are not centered about the motor axis 208. In some embodiments, the motor axis 208 passes through the first and second printed circuit boards 220, 224, but the motor axis 208 is not perpendicular to the first and/or second printed circuit boards 220, 224. In some embodiments, the second printed circuit board 224 is arranged approximately parallel to the first printed circuit board 220 and the battery pack insertion axis 212. In some embodiments, the second printed circuit board 224 includes a thermistor 230 (see FIG. 3) for measuring a temperature of or associated with the high impedance trace. In some embodiments, the thermistor 230 is alternatively included in the first printed circuit board 220. In some embodiments, the thermistor 230 is positioned in proximity to the high impedance trace.

Figure 3:
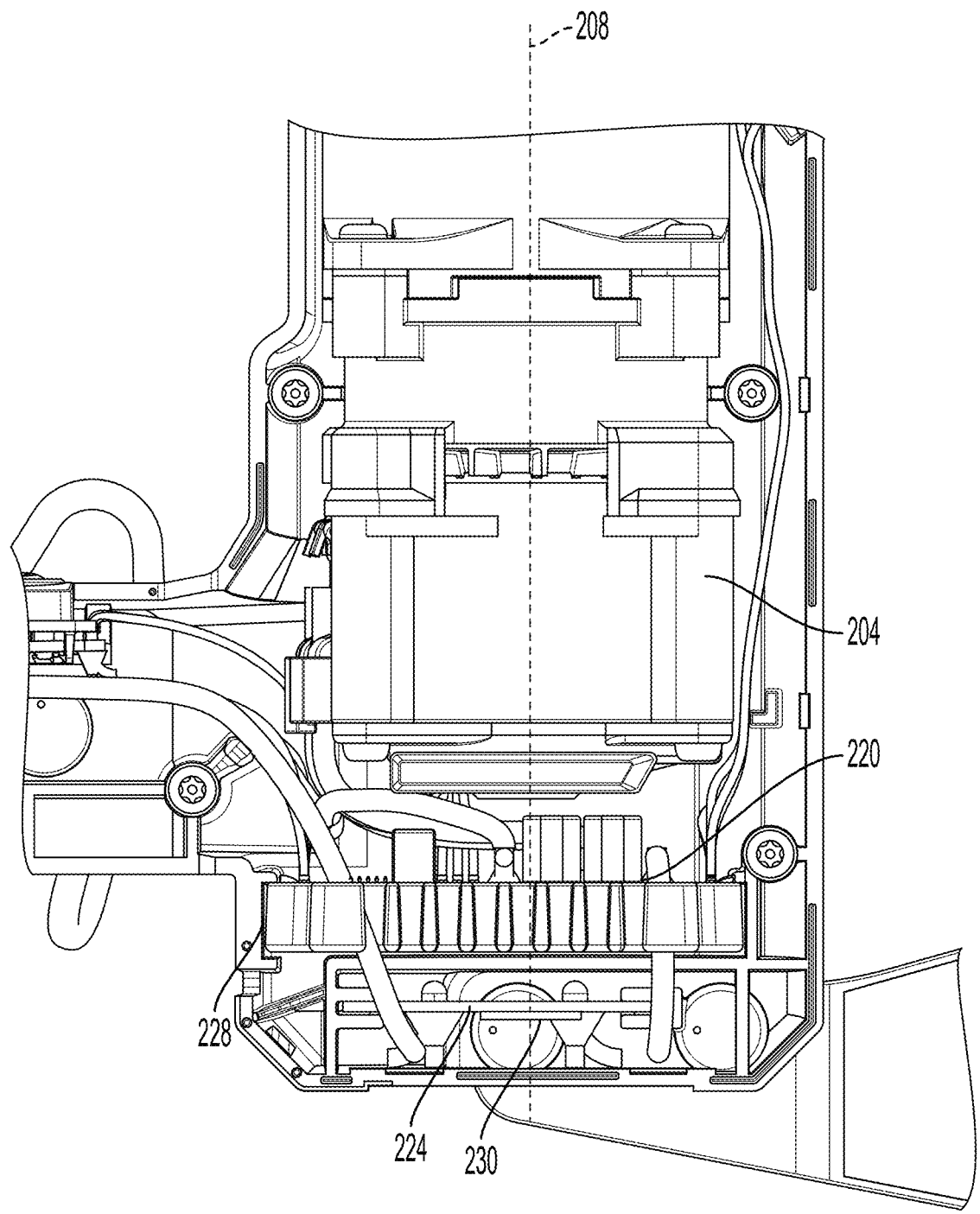
FIG. 3 illustrates a partial cutaway view of the power tool of FIG. 1, according to embodiments described herein.

FIG. 3 illustrates a partial cutaway view of the powered fastener driver 100, with portions of the housing 112 removed. The first printed circuit board 220 is positioned in the motor housing portion 120 between the motor 204 and the second printed circuit board 224. The motor 204, the first printed circuit board 220, and the second printed circuit board 224 are approximately centered about the motor axis 208. The heat sink 228, which is in thermal communication with the first printed circuit board 220, is also approximately centered about the motor axis 208. In some embodiments, the heat sink 228 is positioned between the first printed circuit board 220 and the second printed circuit board 224. In other embodiment, the heat sink 228 is positioned between the motor 204 and the first printed circuit board 220.

Figure 4:
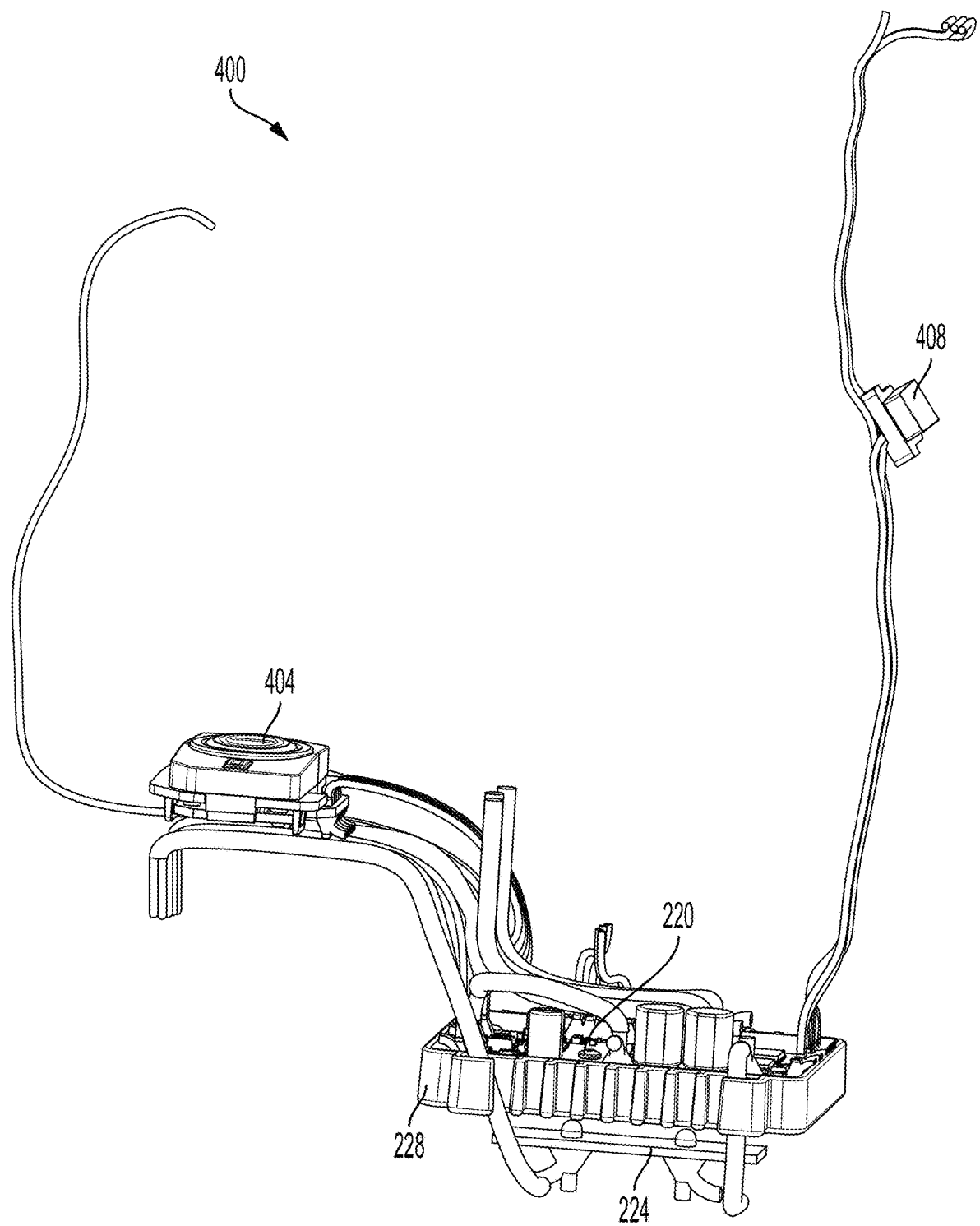
FIG. 4 illustrates a perspective view of a printed circuit board assembly included in the power tool of FIG. 1, according to embodiments described herein.

FIG. 4 illustrates an isolated control assembly 400 for the fastener driver 100 that has been removed from the housing 112 of the fastener driver 100. The control assembly 400 includes a user interface panel or user interface circuit board 404 and an indicator board 408 (e.g., an LED board). In the embodiment illustrated in FIG. 4, the second printed circuit board 224 is tucked underneath the heat sink 228 and first printed circuit board 200 such that the first printed circuit board 220 is approximately parallel to the second printed circuit board 224.

Figure 5:
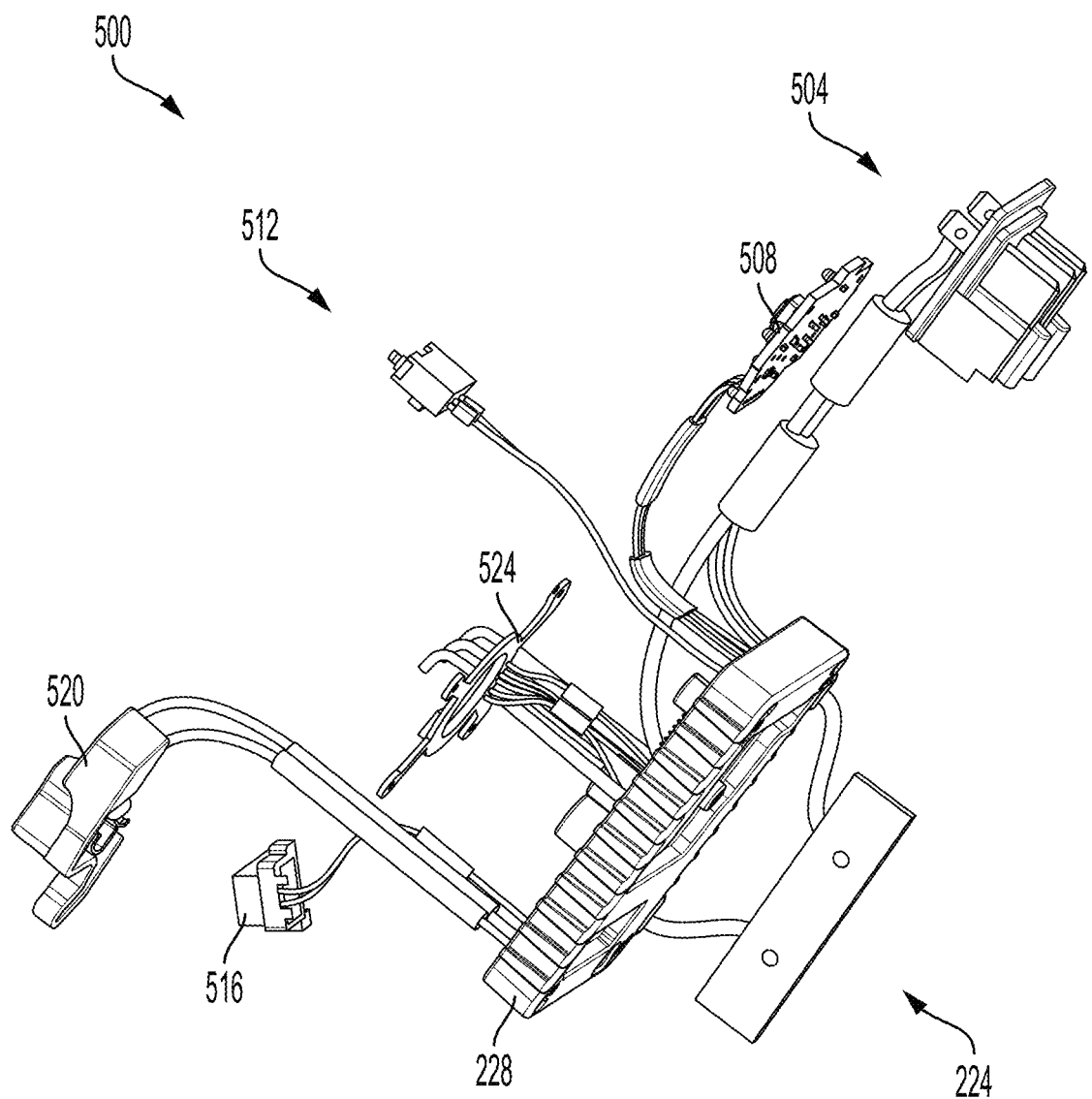
FIG. 5 illustrates another perspective view of a printed circuit board assembly included in the power tool of FIG. 1, according to embodiments described herein.
Figure 6:
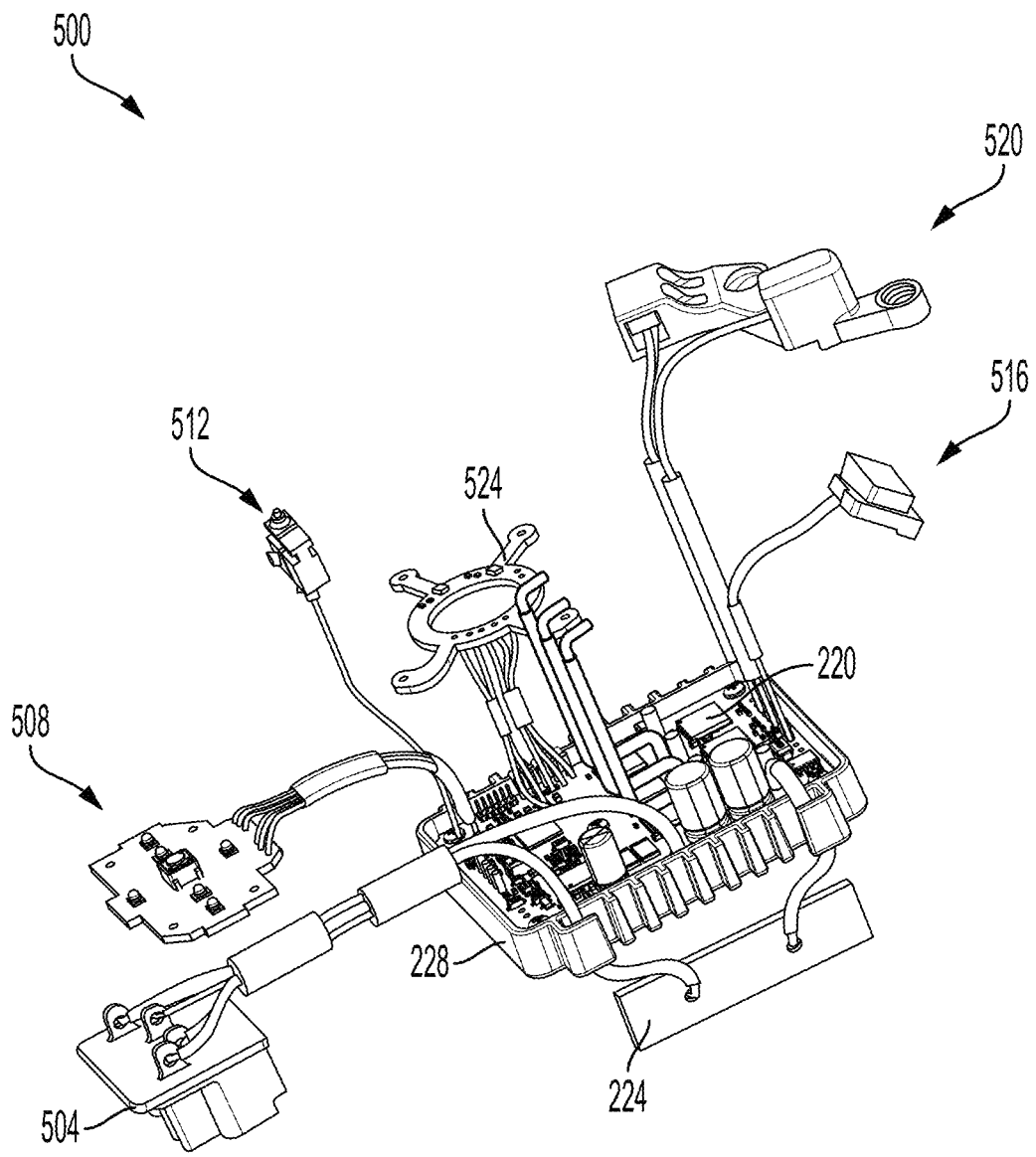
FIG. 6 illustrates another perspective view of a printed circuit board assembly included in the power tool of FIG. 1, according to embodiments described herein.

FIGS. 5 and 6 illustrate another isolated control assembly 500. The control assembly 500 includes the first printed circuit board 220 and the second printed circuit board 224. The control assembly 500 also includes a terminal block 504, user interface ("UI") board 508, a trigger switch 512, a work light LED 516, Hall Effect sensors 520 (e.g., for detecting a linear position of the nosepiece 108 or firing pin of the fastener driver 100), and a Hall Effect sensor board 524 (e.g., for detecting a rotational position of the motor 204). The first printed circuit board 220 is mounted in the heat sink 228 (e.g., an aluminum heat sink potting boat), and is electrically connected to the terminal block 504, the UI board 508, the trigger switch 512, the UI board 508, the Hall Effect sensors 520, and the Hall Effect sensor board 524. The second printed circuit board 224 is positioned beneath the heat sink 228. The second printed circuit board 224 is electrically connected to the first printed circuit board 220. In the embodiment illustrated in FIG. 5, the second printed circuit board 224 is tucked underneath the heat sink 228 and first printed circuit board 200 such that the second printed circuit board 224 is approximately perpendicular to the first printed circuit board 220 and the heat sink 228.

Figure 7A:
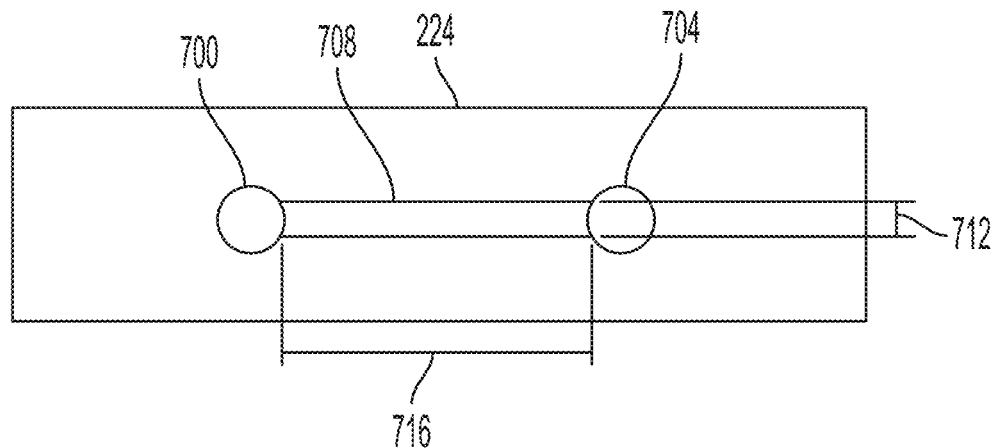
FIG. 7A illustrates top view of a printed circuit board including a high impedance trace, according to embodiments described herein.
Figure 7B:
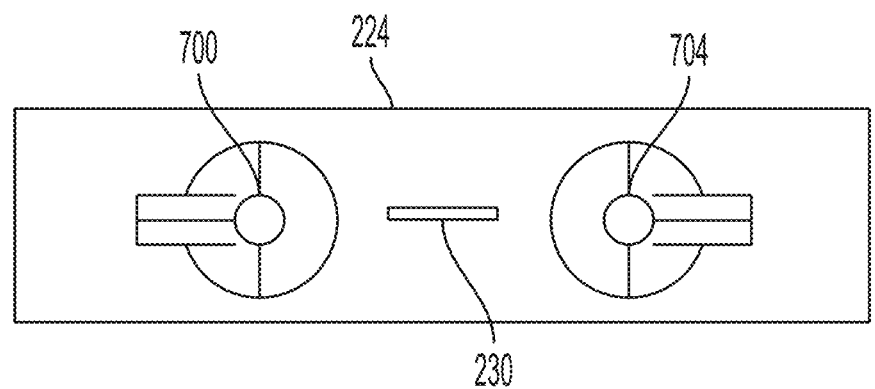
FIG. 7B illustrates a bottom view of the printed circuit board of FIG. 7A, according to embodiments described herein.

FIGS. 7A and 7B illustrate a top view and a bottom view, respectively, of the second printed circuit board 224. The second printed circuit board 224 includes a first node 700 and a second node 704. The first node 700 and the second node 704 are connection points for electrically connecting the second printed circuit board 224 to the first printed circuit board 220. The second printed circuit board 224 also includes a high impedance trace 708 on the second printed circuit board 224. The high impedance trace 708 has a width 712 and a length 716, which determine a current rating of the high impedance trace 708. For example, the width 712 of the high impedance trace 708 may be half an inch. However, the width 712 of the high impedance trace 708 is not limited to half an inch and may be more than half an inch or less than half an inch. In some embodiments, the width 712 of the high impedance trace 708 is between one sixteenth of an inch and one inch. The length 716 of the high impedance trace 708 may be two inches. However, the length 716 is not limited to two inches and may be more than two inches or less than two inches. In some embodiments, the length 716 of the high impedance trace 708 is between one quarter of an inch and five inches. The high impedance trace 708 also includes a weight (e.g., a material weight) which also affects the current rating of the high impedance trace 708. For example, the high impedance trace 708 may be made from two ounce copper traces. In some embodiments, the high impedance trace 708 is made from one two once copper trace. However, the weight of the high impedance trace 708 is not limited to two ounces, and may be greater or less than two ounces (e.g., between one ounce and five ounces). Any one of the dimensions of the high impedance trace 708, including width 712, the length 716, and weight, may be tailored to a desired current limit for the power tool 100 (e.g., based on the application of the power tool 100). The length 716 of the high impedance trace 708 is approximately the distance between the first node 700 and the second node 704, such that the high impedance trace 708 is configured to electrically connect the first node 700 and the second node 704.

The high impedance trace 708 is further configured to interrupt current flow in the fastener driver 100 in response to a current that exceeds a current limit or predetermined threshold value (e.g., due to a shoot through event, a FET that has a failed drain-to-source, etc.). During an overcurrent event (e.g., when current exceeds the current limit), the high impedance trace 708 heats up as current increases. Once the current through the high impedance trace 708 exceeds the current limit (e.g., corresponding to a melting point of the high impedance trace 708), the high impedance trace 708 melts or otherwise opens to form a gap in the electrical connection between the first node 700 and the second node 704. Accordingly, in response to current exceeding the current limit, the high impedance trace 708 is configured to interrupt electric power to the motor 204.

FIG. 8 illustrates a control system for the fastener driver 100 including the high impedance trace 708. The control system includes a controller 800. The controller 800 is electrically and/or communicatively connected to a variety of modules or components of the fastener driver 100. For example, the illustrated controller 800 is electrically connected to the motor 204, the battery pack interface 128, the trigger switch 512 (connected to the trigger 216), one or more sensors or sensing circuits 804 (e.g., voltage sensors, current sensors, temperature sensors [e.g., thermistor(s) 230], etc.), one or more indicators 808, a user interface module 810, a power input module 812, the high impedance trace 708, and a switching circuit 816 (e.g., including a plurality of switching FETs). In some embodiments, controller 800 is configured to receive a signal (e.g., a voltage) from the thermistor 230.

The controller 800 includes combinations of hardware and software that are operable to, among other things, control the operation of the fastener driver 100, monitor the operation of the fastener driver 100, activate the one or more indicators 808 (e.g., an LED), etc. The high impedance trace 708 is connected between the battery pack interface 128 and the switching circuit 816.

The controller 800 includes a plurality of electrical and electronic components that provide power, operational control, and protection to the components and modules within the controller 800 and/or the fastener driver 100. For example, the controller 800 includes, among other things, a processing unit 820 (e.g., a microprocessor, a microcontroller, an electronic processor, an electronic controller, or another suitable programmable device), a memory 824, input units 828, and output units 832. The processing unit 820 includes, among other things, a control unit 836, an arithmetic logic unit ("ALU") 840, and a plurality of registers 844 (shown as a group of registers in FIG. 8), and is implemented using a known computer architecture (e.g., a modified Harvard architecture, a von Neumann architecture, etc.). The processing unit 820, the memory 824, the input units 828, and the output units 832, as well as the various modules or circuits connected to the controller 800 are connected by one or more control and/or data buses (e.g., common bus 848). The control and/or data buses are shown generally in FIG. 8 for illustrative purposes. The use of one or more control and/or data buses for the interconnection between and communication among the various modules, circuits, and components would be known to a person skilled in the art in view of the invention described herein.

The memory 824 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 820 is connected to the memory 824 and executes software instructions that are capable of being stored in a RAM of the memory 824 (e.g., during execution), a ROM of the memory 824 (e.g., on a generally permanent basis), or another non-transitory computer readable medium such as another memory or a disc. Software included in the implementation of the fastener driver 100 can be stored in the memory 824 of the controller 800. The software includes, for example, firmware, one or more applications, program data, filters, rules, one or more program modules, and other executable instructions. The controller 800 is configured to retrieve from the memory 824 and execute, among other things, instructions related to the control processes and methods described herein. In other constructions, the controller 800 includes additional, fewer, or different components.

The battery pack interface 128 includes a combination of mechanical components (e.g., rails, grooves, latches, etc.) and electrical components (e.g., one or more terminals) configured to and operable for interfacing (e.g., mechanically, electrically, and communicatively connecting) the fastener driver 100 with the battery pack 132. For example, power provided by the battery pack 132 to the fastener driver 100 is provided through the battery pack interface 128 to the power input module 812. The power input module 812 includes combinations of active and passive components to regulate or control the power received from the battery pack 132 prior to power being provided to the controller 800. The battery pack interface 128 also supplies power to the switching circuit 816 through the high impedance trace 708 to be switched by the switching circuit 816 to selectively provide power to the motor 204. The battery pack interface 128 also includes, for example, a communication line 852 for providing a communication line or link between the controller 800 and the battery pack 132. In some embodiments, the controller 800 is also electrically and/or communicatively connected to the high impedance trace 708 via a signal line.

The indicators 808 include, for example, one or more light-emitting diodes ("LEDs"). The indicators 808 can be configured to display conditions of, or information associated with, the fastener driver 100. For example, the indicators 808 are configured to indicate measured electrical characteristics of the fastener driver 100, the status of the fastener driver 100, the status of the high impedance trace 708, etc. The user interface module 810 is operably coupled to the controller 800 to, for example, select a forward mode of operation or a reverse mode of operation, a torque and/or speed setting for the fastener driver 100 (e.g., using torque and/or speed switches), etc. In some embodiments, the user interface module 810 includes a combination of digital and analog input or output devices required to achieve a desired level of operation for the fastener driver 100, such as one or more knobs, one or more dials, one or more switches, one or more buttons, etc.

In some embodiments, in the event that the high impedance trace 708 is opened due to a high current, the indicators 808 are configured to illuminate to alert a user that the high impedance trace 708 has opened and, for example, service of the fastener driver 100 is required.

Figure 9:
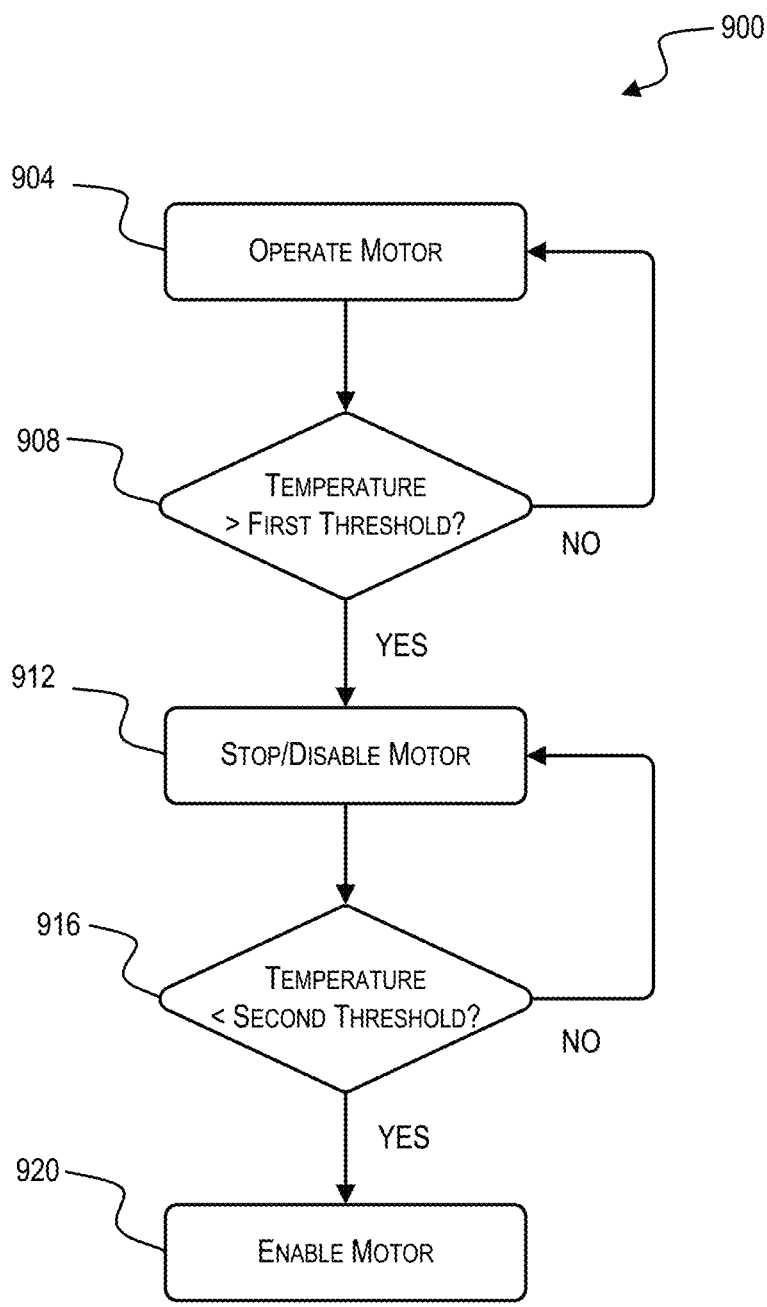
FIG. 9 is a process for controlling the power tool of FIG. 1 based on temperature, according to embodiments described herein.

FIG. 9 is a flowchart illustrating a motor operation process 900 according to some embodiments. During operation of the motor 204 (STEP 904), the controller 800 may repeatedly check the temperature measured by the thermistor 230 to determine a temperature of or associated with the high impedance trace 708. If the temperature measured by the thermistor 230 exceeds a first temperature threshold (STEP 908), the controller 800 may disable or otherwise control the motor 204 to coast or brake to a stop (STEP 912). If the temperature does not exceed the first temperature threshold, the process 900 returns to STEP 904. The first temperature threshold may be, for example, 120 degrees Celsius. The first temperature threshold is not limited to 120 degrees Celsius, and may be more than 120 degrees Celsius or less than 120 degrees Celsius. In some embodiments, the first temperature threshold has a value of between 80 degrees Celsius and 160 degrees Celsius. The first temperature threshold can be modified based on the power tool 100 and/or the properties of the high impedance trace 708. The controller 800 may continue to prevent operation of the fastener driver 100, for example, by disabling the motor 204, until the temperature measured by the thermistor 230 is less than a second temperature threshold (STEP 916). In some embodiments, the second temperature threshold is the same as the first temperature threshold. In some embodiments, the second temperature threshold is less than the first temperature threshold. In some embodiments, the second temperature threshold has a value of between 30 degrees Celsius and 160 degrees Celsius. The second temperature threshold can be modified based on the power tool 100 and/or the properties of the high impedance trace 708.

Once the temperature measured by the thermistor 230 is less than the second temperature threshold, the controller 800 may enable the motor 204 or otherwise allow operation of the power tool 100 (STEP 920). In some embodiments, the trigger 216 is also cycled (e.g., turned OFF and ON) to re-enable operation of the power tool 100. Therefore, the controller 800 prevents the temperature of the high impedance trace 708 from exceeding a melting point of the high impedance trace 708 during, for example, extreme operation of the power tool 100 (e.g., without the presence of a high current that would normally open (e.g., melt) the high impedance trace 708.

Figure 10:
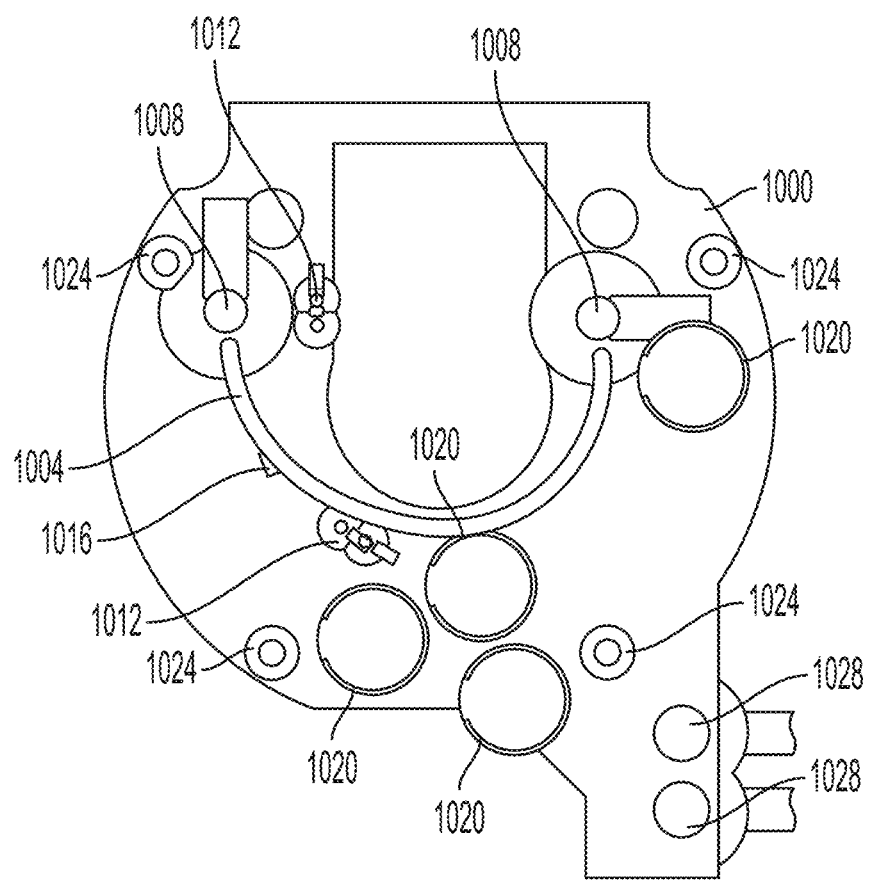
FIG. 10 illustrates a top view of a printed circuit board including a high impedance trace and one or more additional electrical or mechanical components, according to embodiments described herein.

Referring now to FIG. 10, in some embodiments, the power tool 100 includes a printed circuit board 1000 that includes a high impedance trace 1004 and one or more other electrical or mechanical components. For example, the printed circuit board 1000 includes power wires 1008, thermistor wires 1012, a thermistor 1016, a plurality of bus capacitors 1020, mounting hardware 1024 (e.g., fasteners, screws, screw bosses, etc.), and power jumpers 1028 for connecting the printed circuit board 1000 to a power board for the power tool 100. In some embodiments, the printed circuit board 1000 includes one or more integrated circuits. The high impedance trace 1004 may be included alternatively or in addition to the high impedance trace 708. In some embodiments, the high impedance trace 1004 is substantially similar to the high impedance trace 708 described above in reference to FIGS. 7A-7B. In some embodiments, the high impedance trace 1004 is formed in a curvilinear shape. The thermistor 1016 is configured to measure a temperature of or associated with the high impedance trace 1004. The thermistor 1016 may be substantially similar to the thermistor 230, as described above. In some embodiments, the printed circuit board 1000 includes one or more of the electrical or mechanical components illustrated in FIG. 10 in addition to the high impedance trace 1004. In other embodiments, the printed circuit board 1000 includes additional electrical or mechanical components not illustrated in FIG. 10.

Although aspects of the present disclosure have been described in detail with reference to certain embodiments, variations and modifications exist within the scope and spirit of one or more independent aspects as described. Various features of the disclosure are set forth in the following claims.

What is claimed is:

1. A power tool comprising:
   a housing including a motor housing portion and a handle portion;
   a motor positioned within the motor housing portion, the motor including a motor axis;
   a battery pack interface configured to receive a battery pack, the battery pack interface configured to be electrically connected to the motor for supplying electrical power to the motor; and
   a printed circuit board positioned within the motor housing portion, the printed circuit board intersecting the motor axis, the printed circuit board including a conductive high impedance trace that is configured to interrupt electric power to the motor in response to a current that exceeds a current limit.

2. The power tool of claim 1, wherein the current limit corresponds to a melting point of the conductive high impedance trace.

3. The power tool of claim 1, wherein the printed circuit board is approximately centered on the motor axis.

4. The power tool of claim 1, wherein the conductive high impedance trace is at least a two ounce copper trace.

5. The power tool of claim 1, wherein the printed circuit board is electrically connected between the battery pack interface and a power board of the power tool.

6. The power tool of claim 1, further comprising:
a thermistor; and
a controller connected to the thermistor, the controller configured to:
receive a signal from the thermistor related to a temperature of the conductive high impedance trace,
determine the temperature of the conductive high impedance trace, and disable, when the temperature of the conductive high impedance trace is greater than a threshold value, the motor.

7. The power tool of claim 1, wherein the conductive high impedance trace is formed in a curvilinear shape.

8. A power tool comprising:
a housing including a motor housing portion and a handle portion;
a motor positioned within the motor housing portion, the motor including a motor axis;
a battery pack interface configured to receive a battery pack, the battery pack interface configured to be electrically connected to the motor for supplying electrical power to the motor;
a first printed circuit board positioned within the motor housing portion, the first printed circuit board intersecting the motor axis; and
a second printed circuit board positioned within the motor housing portion, the second printed circuit board intersecting the motor axis, the second printed circuit board including a conductive high impedance trace that is configured to interrupt electric power to the motor in response to a current that exceeds a current limit.

9. The power tool of claim 8, wherein the current limit corresponds to a melting point of the conductive high impedance trace.

10. The power tool of claim 9, wherein the first printed circuit board is approximately centered on the motor axis.

11. The power tool of claim 10, wherein the second printed circuit board is approximately centered on the motor axis.

12. The power tool of claim 11, wherein the first printed circuit board is positioned between the motor and the second printed circuit board.

13. The power tool of claim 8, wherein:
the battery pack interface includes a battery pack insertion axis perpendicular to the motor axis; and
the second printed circuit board is parallel to the battery pack insertion axis.

14. The power tool of claim 8, wherein the conductive high impedance trace is at least a two ounce copper trace.

15. The power tool of claim 8, wherein the second printed circuit board is electrically connectable between to the battery pack interface and the first printed circuit board.

16. The power tool of claim 8, further comprising:
a thermistor; and
a controller connected to the thermistor, the controller configured to:
receive a signal from the thermistor related to a temperature of the conductive high impedance trace,
determine the temperature of the conductive high impedance trace, and
disable, when the temperature of the conductive high impedance trace is greater than a threshold value, the motor.

17. A method of operating a power tool, the method comprising:
driving a motor;
sensing, with a thermistor coupled to a printed circuit board, a temperature of a conductive high impedance trace on the printed circuit board;
receiving, with a controller, a signal from the thermistor related to the temperature of the conductive high impedance trace;
determining, with the controller, whether the temperature of the conductive high impedance trace exceeds a first threshold; and
disabling operation of the motor when the temperature of the conductive high impedance trace exceeds the first threshold.

18. The method of claim 17, further comprising:
determining, with the controller and after disabling operation of the motor, whether the temperature of the conductive high impedance trace is less than a second threshold; and
enabling operation of the motor when the temperature of the conductive high impedance trace is less than the second threshold,
wherein the second threshold is less than the first threshold.

19. The method of claim 18, further comprising:
interrupting, with the conductive high impedance trace, electric power to the motor in response to a current that exceeds a current limit.

20. The method of claim 18, wherein the conductive high impedance trace is at least a two ounce copper trace.

* * * * *